Oct. 9, 1923.
G. W. CLAPP
MEANS FOR SELECTION OF ARTIFICIAL TEETH
Filed Aug. 20, 1919
1,469,893
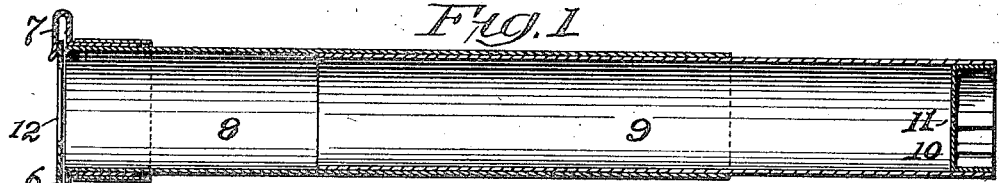
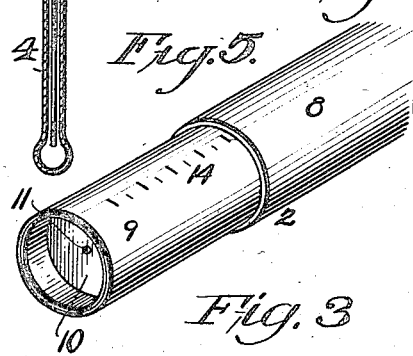
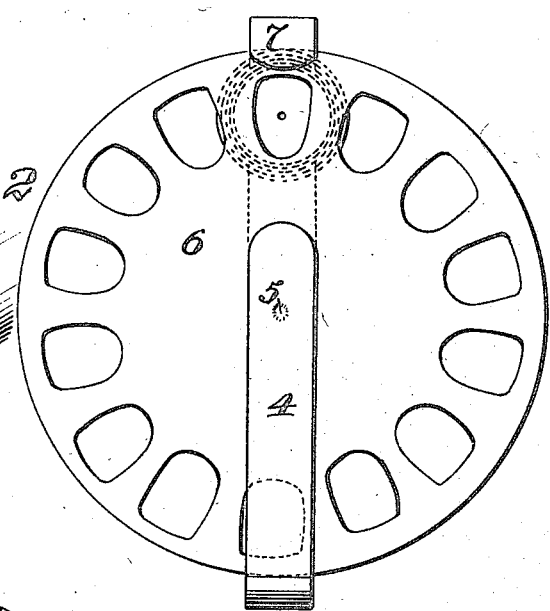
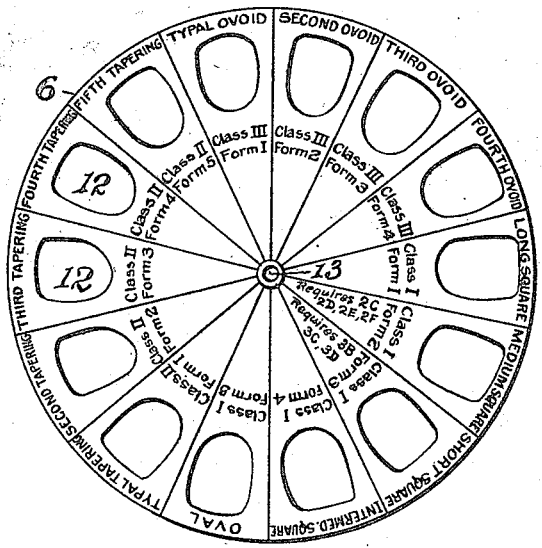
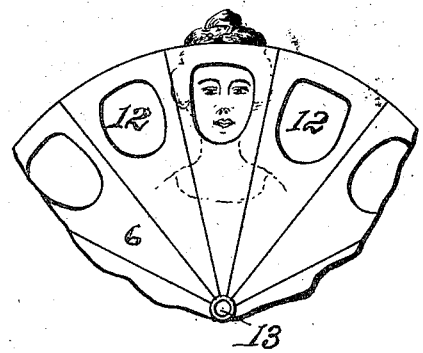
Inventor
George Wood Clapp
By [signature]
Attorney Patented Oct. 9, 1923.

1,469,893

UNITED STATES PATENT OFFICE.

GEORGE WOOD CLAPP, OF NEW ROCHELLE, NEW YORK, ASSIGNOR TO THE DENTISTS' SUPPLY COMPANY, A CORPORATION OF NEW YORK.

MEANS FOR SELECTION OF ARTIFICIAL TEETH.

Application filed August 20, 1919. Serial No. 318,638.

*To all whom it may concern:*

Be it known that I, GEORGE WOOD CLAPP, a citizen of the United States, and resident of New Rochelle, county of Westchester, and State of New York, have invented an Improvement in Means for Selection of Artificial Teeth, of which the following is a specification.

It is well known that skulls of many persons differ to such an extent that the shapes of the faces may be classified as oval, square, ovoid, and tapering, and these again subdivided as long square, medium square, short square, intermediate square, typal tapering, second tapering, third tapering, fourth tapering, fifth tapering, typal ovoid, second ovoid, third ovoid, fourth ovoid, and I have adopted this classification for use of my invention. It is also well known that the general shapes of the inverted upper central incisor of persons correspond to a material degree to the general facial contour. It is the object of my invention to provide a suitable means which may be used by dentists in determining the most effective selection of frontal teeth when making up dentures, the use of the said means and the practice of the method enabling him to determine the classification and preferably the size of the face of the patient and thereby the type and size also of artificial teeth best suited to the patient.

Broadly considered, my invention comprehends means which will enable a dentist to determine the general shape and relative dimensions of the face and which, by suitable indicator devices, will automatically determine the type and shape of artificial teeth to be used, thereby enabling a dentist, with very little labor and with no personal knowledge or esthetical judgment, to select the frontal sets of teeth as to shape and form, best suited to the needs of the patient. As the artificial teeth made by manufacturers are all classified as to types and sizes, it is only left for the dentist to use judgment in selection of color. The selection of color, however, is a matter of relatively small importance where complete dentures are being made.

Generally considered, my invention consists of suitable means whereby the general shape or configuration of a patient's face or a portion thereof may be determined in connection with the special shapes and forms of artificial teeth corresponding to the central incisors of the upper jaw when inverted, and this is accomplished by means of a sheet interposed between the face of the patient and the observer (dentist) whereby the comparison of the inverted outlines corresponding to the special tube forms may be made with the observed portions of the face of the patient, said sheet or object so employed having thereon marks or indicia from which the observer or dentist may be able to determine the particular shape or form of the tooth best suited for the character of the face of the patient under examination; and the said sheet or object is so formed that it contains one or more outlines or apertures providing bounding lines which may be brought more or less into alinement with the main features of the patient to be viewed and compared, it being desirable in the complete carrying out of the invention to have a plurality of outlines corresponding to the different forms of manufactured teeth with which the outlines of the face of the patient are to be compared.

My invention consists in its most complete and preferred form, of a disk divided radially by lines or markings and containing a specially shaped aperture in each of its divisions, said apertures respectively having the various facial shapes hereinbefore stated and the corresponding division containing printed matter designating the particular classes and types of the teeth required to suit the shapes of the faces viewed through the apertures, and the said disk may be journaled in a frame carrying an eye piece, preferably of an extensible character so as to focus the face within the aperture; and if the device be used at a definite distance from the patient (5 feet for example) a scale marking upon the extensible eye piece may be employed to determine the sizes of the teeth required.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists can be variously formed, arranged or organized and that my invention is not limited to the precise arrangement and organization of the instrumentalities herein shown and described.

Referring to the drawings: Fig. 1 is a longitudinal vertical section through a device embodying my invention; Fig. 2 is a rear elevation of the same; Fig. 3 is a front view of the disk removed from the holder and eye piece; Fig. 4 is an elevation showing how the apertures of the disk correspond to the facial contour when the device is used in determining the form of the teeth to be selected; and Fig. 5 is a perspective view of the eye piece.

2 is an extensible eye piece, 3 is the holder attached to the end thereof and 6 is the disk having the selective aperture forms and the corresponding printed class and form designations corresponding to the apertures.

The eye piece, in the form shown, comprises a tubular barrel 8 with an extensible barrel 9 sleeved therein in telescopic relation and having at its end a solid disk or diaphragm 10 with a small sight hole 11 therein, which may be provided with a transparent medium such as glass in lens or other form. The barrel 9 may have a scale marked along its surface at 4 (Fig. 5) to show the extent of adjustment and thereby indicate the size of the teeth required, as more fully explained hereinafter. The end of the outer barrel 8 is fitted with a holder frame 3 having a depending looped portion 4, the two parts of which have nipples 5 extending toward each other and engaging a central aperture 13 in the disk 6, whereby the disk is so journaled as to be capable of being rotated to bring the several apertures 12 thereof successively in front of the end of the barrel 8 and in line with the eye piece. The spring action of the arm 4 of the holder removably holds the disk 6 in rotatable position, but permits its ready removal when desired for storage or shipment. The upper end of the holder is further provided with an inverted U-shaped guide part 7 in which the upper perimeter of the disk is guided, to insure it moving close to the barrel 8.

Referring to the disk 6 (Fig. 3), it may be stamped from sheet metal, cardboard, celluloid, or other suitable sheet material and the apertures 12 therein are all arranged equidistant from the axis 13, each aperture being arranged in a radial division of the disk, which may also contain markings or indicia designating class number, type form, and teeth numbers, or any other markings or indicia used by the manufacturers for identifying teeth. It is to be understood that these special markings are referred to only by way of example and in no sense as a restriction or limitation of the invention, because each manufacturer has his own manner of marking his artificial teeth and the disk sections should be marked accordingly. This, however, would not apply to the general shapes of the apertures as these are characteristic of facial shapes, and while I have shown 14 such shapes, the disk may contain a different number of apertures, if so desired.

The use of the device in the practice of the method may be carried out as follows: Assuming that the patient for whom the dentures are required, is arranged at a predetermined distance of five feet away from the dentist, the device is directed in front of the face of the patient while the dentist looks through the aperture 11 in the eye piece and adjusts the barrel 9 to the barrel 8 until the patient's face is brought into view to substantially fill one of the apertures 12, as indicated in Fig. 4. The disk 6 is then revolved to bring different apertures into alinement until the proper shaped aperture is determined. The dentist then makes note of the markings on the section of the disk corresponding to the selected aperture 12 and this determines the class and form of the teeth required. This reference to the disk markings however, does not give the sizes of the the teeth which are required for a large or small person, and to ascertain this requirement, the size is read from the scale 14 where crossed by the end of the barrel 8, the greater the extension of the barrel 9, the smaller the teeth required and vice versa.

It will be apparent that the disk need not have the tooth markings upon it, as these may be upon a separate card and identified by the number of broad class designations, such as at the perimeter of the disk; but I prefer to place all of the markings or designations upon the disk, since it is more convenient for reference and there is no possibility of misplacement of the specifications of the tooth memorandum required. This of course does not refer to the question of size, as that is a matter of direct reading of the scale 14 and not for reference to a card designation.

I also point out that my invention depends upon the general fact that the tooth shapes and sizes, substantially harmonize with the facial form and that my invention should be considered as generically including all methods and means of measuring the facial form or shape and size or portions thereof of the patient by viewing the same through outlined inverted tooth forms and therefrom determining the class and form and preferably the size also of the teeth required.

While it is specially intended to view the entire face of the patient through the outline or perforation in the sheet to determine the proper shape of the tooth form required, it is manifest that if the patient still retains one of the upper incisors in reasonably good condition as to outline, the actual comparison between the said tooth and the outlines or apertures in the sheet or card may be made, but in this case, of course, the outline or aperture in the card or sheet would necessarily be of small size.

In using my improved instrument in making comparison of the apertures 12 with an upper incisor of the patient, it is only necessary to turn the instrument so that the disk is brought above the sight barrel when viewing the tooth and the dentist would make the distance of the instrument from the patient suitable to meet the requirements of the relative size of the aperture compared to the area of the natural tooth being viewed, bringing the instrument closer to the patient under such conditions, assuming that the size of the apertures in the disk are approximately equal to or smaller than the area of the tooth.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

I have also described my improved method of using the device in that particularity which I deem to be the best exposition of my invention, and that which I prefer in commercial practice, but I do not confine myself to the details of procedure in the tooth selection, as the method may be carried out in principle even though minor variations in the steps are resorted to.

Having now described my invention what I claim as new and desire to secure by Letters Patent, is:—

1. In a device of the character stated, means for determining the facial form of a patient comprising a plurality of differently shaped outlines through which the face may be successively viewed, provided with means automatically indicated thereby for determining the proper form of artificial teeth required for the patient.

2. The invention according to claim 1, further distinguished by having the means for determining the facial form, comprised of a movable part having a plurality of differently shaped apertures corresponding to different facial forms, and an eye piece for directing the line of vision upon the patient through the apertures separately.

3. The invention according to claim 1, having the means for determining the facial form, comprised of a telescopic eye piece for viewing the face of the patient, and a rotatable disk journaled upon the eye piece and provided with a plurality of differently shaped apertures arranged in a circle and corresponding to different facial forms and also having markings to indicate the respective forms corresponding to the apertures, said apertures arranged so as to be successively brought into alinement with the telescopic eye piece.

4. The invention according to claim 1, also having means for automatially indicating the size of the teeth required when the facial form of the patient has been determined in ascertaining the form of the teeth required.

5. The invention included under claim 3, further characterized by having the telescopic eye piece extensible and provided with an indicating scale which determines the size of the teeth required.

6. Means for determining the shape and size of artificial teeth for a patient, comprising means having a plurality of differently shaped outlines through which the face of the patient may be successively viewed for determining the shape of the teeth from the general facial form of the face of the patient viewed through the outlines, and means automatically moved into view with the outline and indicating the size of the teeth suitable for the face whose form has been determined.

7. Means for determining the shape and size of artificial teeth for a patient, comprising means having a plurality of differently shaped outlines through which the face of the patient may be successively viewed for determining the shape of the teeth from the general facial form of the face of the patient viewed through the outlines, and means automatically moved into view with the outline and indicating the size of the teeth suitable for the face whose form has been determined, said means for indicating the size constructed to indicate a relative difference in vertical dimensions of the facial form of different patients.

8. In a device of the character stated, means comprising a frame and a movable part pivoted thereto and through which the face is viewed for indicating the facial form of a patient, and a secondary adjustable part for bringing the face successively within the contour of the apertures, said part having means for indicating the vertical height of the teeth required to correspond to the facial form determined.

9. In a device of the character stated, means comprising a frame and a movable part pivoted thereto and through which the face is viewed for indicating the facial form of a patient, and a secondary adjustable part for bringing the face successively within the contour of the apertures, said part having means for indicating the vertical height and width of the teeth required to correspond to the facial form determined.

10. In a device of the character stated, the combination of an extensible eye piece having a sight hole at one end and a U-shaped frame at the other end, with a disk supported in the U-shaped frame so as to be rotatable thereon and having a plurality of facial form apertures of different shapes arranged in a circle about its axis to come successively into alinement with the eye piece, said apertures being respectively designated by different identifying markings upon the disk.

11. In a device of the character stated, the combination of an extensible eye piece having a sight hole at one end and a scale to indicate sizes of teeth according to the degree of its extension and also having a U-shaped frame at the other end, with a disk supported in the U-shaped frame so as to be rotatable thereon and having a plurality of facial form apertures arranged in a circle about its axis to come successively into alinement with the eye piece, said apertures being designated by markings upon the disk.

12. Means for determining forms of artificial teeth required for a patient, consisting of a sheet having therein a plurality of apertures having different shapes corresponding to different facial forms, the faces of the patients to be viewed through said apertures and said sheet having designations for the respective apertures indicating the forms of teeth required by the patient whose facial form was determined.

13. A chart for dentists, comprising a sheet of suitable material having an outline designated therein through the confines of which light may pass representing the contour of a tooth and constituting a part of the chart, whereby when the sheet is placed in relation and alinement with a human face or a major part thereof so that it is visible within the boundary of the outline, the resemblance thereof with respect to the tooth outline designated upon and forming a part of said chart may be determined.

14. A chart for dentists comprising a sheet of material so formed as to provide a plurality of apertures each having outlines representing different tooth formations and constituting a part of the chart whereby the contour of the face may be determined by comparison with the respective outlines contained upon said chart.

15. A chart for dentists comprising a sheet member having a plurality of outlines representing sub-class modifications of a typal class of teeth, and means upon the sheet whereby each outline may be individually identified.

16. A chart for dentists having a plurality of outlines representing reproductions of tooth molds, identifying indicia or each of said outlines, and means whereby said chart may be adjusted in front of and in visual alinement with the face of a patient.

17. A chart for dentists, comprising a sheet of material having a plurality of outlines representing distinguishing characteristics of tooth formations through the confines of which light may pass to be viewed in inverted position, whereby said outlines may be placed in such relation with respect to the human face as to permit of a relative comparison between said chart outlines and the facial outlines.

18. In a device to insure proper selection of tooth forms for patients, means having an outline representing a tooth shape and permitting the passage of light rays within the confines of said outline, adapted for interposition between the patient's face and the eye of the observer, whereby a comparison between the tooth outline and face or portion thereof of the patient may be had.

In testimony of which invention, I hereunto set my hand.

GEORGE WOOD CLAPP.